United States Patent
Manelli et al.

(10) Patent No.: US 11,060,553 B2
(45) Date of Patent: Jul. 13, 2021

(54) ANTI-TAMPERING DEVICE

(71) Applicant: Lombardini S.R.L., Reggio Emilia (IT)

(72) Inventors: Stefano Manelli, Castellarano (IT); Marco Magnani, Reggio Emilia (IT); Luciano Rosastri, Reggio Emilia (IT); Valentino Scarpellini, Gaida (IT)

(73) Assignee: Kohler Co., Kohler, WI (US)

( * ) Notice: Subject to any disclaimer, the term of this patent is extended or adjusted under 35 U.S.C. 154(b) by 176 days.

(21) Appl. No.: 16/435,905

(22) Filed: Jun. 10, 2019

(65) Prior Publication Data

US 2019/0383321 A1 Dec. 19, 2019

(30) Foreign Application Priority Data

Jun. 14, 2018 (IT) .................. 102018000006324

(51) Int. Cl.
| | | |
|---|---|---|
| *F16B 41/00* | (2006.01) | |
| *F16B 37/14* | (2006.01) | |
| *F16B 39/02* | (2006.01) | |
| *F02M 59/26* | (2006.01) | |
| *F02M 59/28* | (2006.01) | |
| *F02M 59/44* | (2006.01) | |
| *F02D 1/04* | (2006.01) | |
| *F16B 43/00* | (2006.01) | |
| *F16B 21/18* | (2006.01) | |

(52) U.S. Cl.
CPC .......... *F16B 41/005* (2013.01); *F16B 39/02* (2013.01)

(58) Field of Classification Search
CPC ...... F16B 41/005; F16B 37/14; F16B 43/001; F16B 21/183; F02B 37/186; F02M 59/265; F02M 59/28; F02M 59/44; F02D 1/045; F02D 2250/18
See application file for complete search history.

(56) References Cited

U.S. PATENT DOCUMENTS 4,736,603 A * 4/1988 Brushaber ........... E05B 73/0076
109/64
5,071,300 A * 12/1991 McCauley ............. F16B 37/14
411/222

(Continued)

FOREIGN PATENT DOCUMENTS

| CN | 106917710 A | | 7/2017 |
|---|---|---|---|
| CN | 106917710 A | * | 7/2017 |
| CN | 206458711 U | | 9/2017 |

(Continued)

OTHER PUBLICATIONS

India Examination Report for India Patent Application No. 201924023302 dated Sep. 30, 2020.

(Continued)

*Primary Examiner* — Bayan Salone
(74) *Attorney, Agent, or Firm* — Lempia Summerfield Katz LLC (57) ABSTRACT

Disclosed is an anti-tampering device including a threaded element having a thread defining a screwing axis and an engaging surface for engagement with a driving tool, and a protection body for preventing the driving tool from engaging the engaging surface. The protection body is coupled to the threaded element so that they are mutually blocked in a direction parallel to the screwing axis and free to spin around the screwing axis.

20 Claims, 7 Drawing Sheets

(56) References Cited

U.S. PATENT DOCUMENTS

2015/0226249 A1* 8/2015 Otto ................ F16B 31/04
                                                                         29/525.02
2017/0370397 A1* 12/2017 Oso ................ F16B 41/005

FOREIGN PATENT DOCUMENTS

| | | | |
|---|---|---|---|
| DE | 2825486 B1 | 7/1979 | |
| DE | 2825486 B1 * | 7/1979 | ............ F16B 41/005 |
| DE | 3217371 A1 | 2/1983 | |
| DE | 102013001081 A1 * | 7/2014 | ............ F16M 13/04 |
| DE | 102013001081 A1 | 7/2014 | |
| EP | 0153487 A1 | 9/1985 | |
| EP | 0153487 A1 * | 9/1985 | ............ F16B 37/14 |
| EP | 3260712 A1 * | 12/2017 | ............ F16B 21/183 |
| EP | 3260712 A1 | 12/2017 | |
| GB | 1051321 A | 12/1966 | |
| GB | 2079884 A * | 1/1982 | ............ F16B 37/14 |
| GB | 2079884 A | 1/1982 | |
| JP | H0749069 Y2 * | 11/1995 | ......... F16C 32/0427 |
| JP | H0749069 A | 12/1995 | |

OTHER PUBLICATIONS

European Search Report for European Patent Application No. 19 17 3829.3 dated Oct. 16, 2019.
Chinese Office Action for Chinese Application No. 201910509558.5 dated Dec. 25, 2020.

* cited by examiner

ANTI-TAMPERING DEVICE

CROSS REFERENCE TO RELATED APPLICATION

This application claims the benefit of Italian National Patent Application No. 102018000006324, filed Jun. 14, 2018, which is hereby incorporated by reference in its entirety.

TECHNICAL FIELD

The present disclosure relates to an anti-tampering device particularly, but not exclusively, for use in an internal combustion engine.

BACKGROUND

Some internal combustion engines, such as some internal combustion engines having mechanical injection systems, may be equipped with one or more threaded elements (e.g. screws or nuts) that may control some of the operating parameters of the engine. These threaded elements may, in some systems, be screwed or unscrewed using conventional driving tools (e.g. wrenches or screwdrivers), in order to adjust some of the operating parameters of the internal combustion engine, such as for example the fuel injected quantity.

The adjustment of these engine operating parameters may be carried out at various times, such as at the end of the production line by authorized personnel of the engine manufacturer in order to guarantee a proper functioning of the internal combustion engine and a limited level of polluting emissions.

However, in some systems where the above-mentioned threaded elements are exposed on the external side of the internal combustion engine, they could be exposed to the environment or tampered with (e.g. screwed or unscrewed without permission) by unauthorized people. For example, after the internal combustion engine has been sold, unauthorized people may tamper with the screw controlling the fuel injection, thereby affecting the performance and potentially altering the engine to produce polluting emissions, without the approval and the consent of the engine manufacturer.

SUMMARY

An object of the present disclosure is that of solving, or at least positively reducing, the above mentioned drawback with a simple, rational, secure and rather inexpensive solution.

This and other objects are achieved by the embodiments of the disclosure having the features included in the independent claims. The dependent claims delineate additional aspects of the various embodiments.

An embodiment of the present disclosure provides an anti-tampering device comprising:
 a threaded element having a thread defining a screwing axis and an engaging surface for engagement with a driving tool, and
 a protection body for preventing the driving tool from engaging the engaging surface,
wherein the protection body is coupled to the threaded element so that they are mutually blocked in a direction parallel to the screwing axis and free to spin around the screwing axis.

An embodiment of the present disclosure provides a method for assembly of an anti-tampering, the method comprising:
 providing a threaded element having a thread defining a screwing axis and an engaging surface for engagement with a driving tool;
 providing a protection body for preventing the driving tool from engaging the engaging surface; and
 coupling the protection body to the threaded element so that the protection body and the threaded element are mutually blocked in a direction parallel to the screwing axis and free to spin around the screwing axis.

Thanks to this solution, the threaded element of the anti-tampering device can be assembled in an internal combustion engine to allow the adjustment of an engine parameter. Once the engine parameter has been properly adjusted, the protection body can be coupled to the threaded element, thereby preventing the engagement of the threaded element with a corresponding driving tool (e.g. with a corresponding wrench or screwdriver). Since the protection body is axially blocked with respect to the threaded element, the protection body cannot be removed to free the engaging surface of the threaded element. On the other hand, since the protection body spins freely with respect to threaded element around the screwing axis, the protection body is completely unable to transmit torque to the threaded element and thus it cannot be used to actively rotate the threaded element. In this way, once the protection body has been coupled, the threaded element cannot be actively rotated (e.g. screwed or unscrewed) and the engine operating parameter cannot be adjusted.

According to an aspect of the anti-tampering device, the engaging surface of the threaded element may be a prismatic surface whose generators are parallel to the screwing axis.

This aspect allows to realize a prismatic joint between the threaded element and the driving tool, which prevents mutual rotations and thus facilitate screwing and unscrewing of the threaded element.

The cross-section of the engaging surface with a plane orthogonal to the screwing axis may have any shape, for example triangular, rectangular, square, pentagonal, hexagonal, heptagonal, octagonal, polygonal, star-shaped or any other shape having at least a linear segment.

According to some embodiments, the engaging surface may be an external surface of the threaded element and the protection body may comprise an annular wall surrounding the engaging surface.

Other embodiments may provide that the engaging surface is an internal surface delimiting a cavity (or socket) of the threaded element and that the protection body comprises a back wall that covers at least partially a mouth of the cavity.

Thanks to both these solutions, the protection body is effectively able to prevent the engagement of the threaded element with the corresponding driving tools.

According to an aspect of the anti-tampering device, the protection body may be coupled to the threaded element by means of a retaining ring partly accommodated in an annular groove of the threaded element and partly accommodated in an annular groove of the protection body.

This solution renders the coupling between the threaded element the protection body quite simple and reliable.

By way of example, the protection body's annular groove may be realized on an internal surface of an annular wall of the protection body which surrounds at least partially the threaded element and which has at least an open end for coupling with the threaded element.

Thank to this solution, the protection body can be easily inserted onto the threaded organ after the threaded organ has been screwed or unscrewed using the driving tool.

According to some embodiments, an opposite end of the annular wall may be closed by a back wall of the protection body.

In this way the protection body is embodied as a sort of cap that encloses and covers the threaded element not only on its lateral sides but also on one axial side.

The back wall of the protection body may have any possible shape, for example a planar shape or dome shape.

Other embodiments may however provide that the opposite end of the annular wall is open so that the protection body becomes as a sort of ring that only covers the lateral sides of the threaded organ.

According to an aspect of the anti-tampering device, the internal surface of the annular wall may comprise, between the open end and the annular groove, an annular portion tapered towards the annular groove.

This tapered annular portion has the effect of radially compressing the retaining ring during the axial insertion of the protection body onto the threaded organ and until it snaps into the annular groove, thereby facilitating the coupling between the threaded element and the protection body.

According to another aspect of the anti-tampering device, the retaining ring has a rectangular cross-section (with respect to a plane containing the screwing axis).

In this way, once the retaining ring has been accommodated in the annular grooves of the threaded element and of the protection body, the retaining ring cannot be removed anymore, thereby preventing the protection body from being separated from the threaded element.

According to some embodiments, the thread of the threaded element may be a male (external) thread.

By way of example, the threaded element may be embodied as a screw or bolt having at least an externally threaded shank and a head (e.g. a polygonal or socket head) carrying the engaging surface.

Other embodiments may however provide that the thread of the threaded element is a female (internal) thread.

By way of example, the threaded element may be embodied as a nut having central hole (e.g. a blind hole or a passing hole) which is internally threaded, and an external surface (e.g. a polygonal surface) which defines the engaging surface.

In this second case, the anti-tampering may further comprise a second threaded element having a male thread that is screwed into the female thread of the threaded element.

In this way, the second threaded element can be effectively used to adjust the engine operating parameter whereas the first threaded element may be used to block to second threaded element in a desired position.

According to a further aspect of this embodiment, an elastomeric ring may be coaxially interposed between the second threaded element and the annular wall of the protection body.

This annular gasket has the effect of reducing the noise that can be originated by the vibrations of the protection body on the threaded element.

BRIEF DESCRIPTION OF THE DRAWINGS

The present invention will now be described, by way of example, with reference to the accompanying drawings.

DETAILED DESCRIPTION

Figure 1:
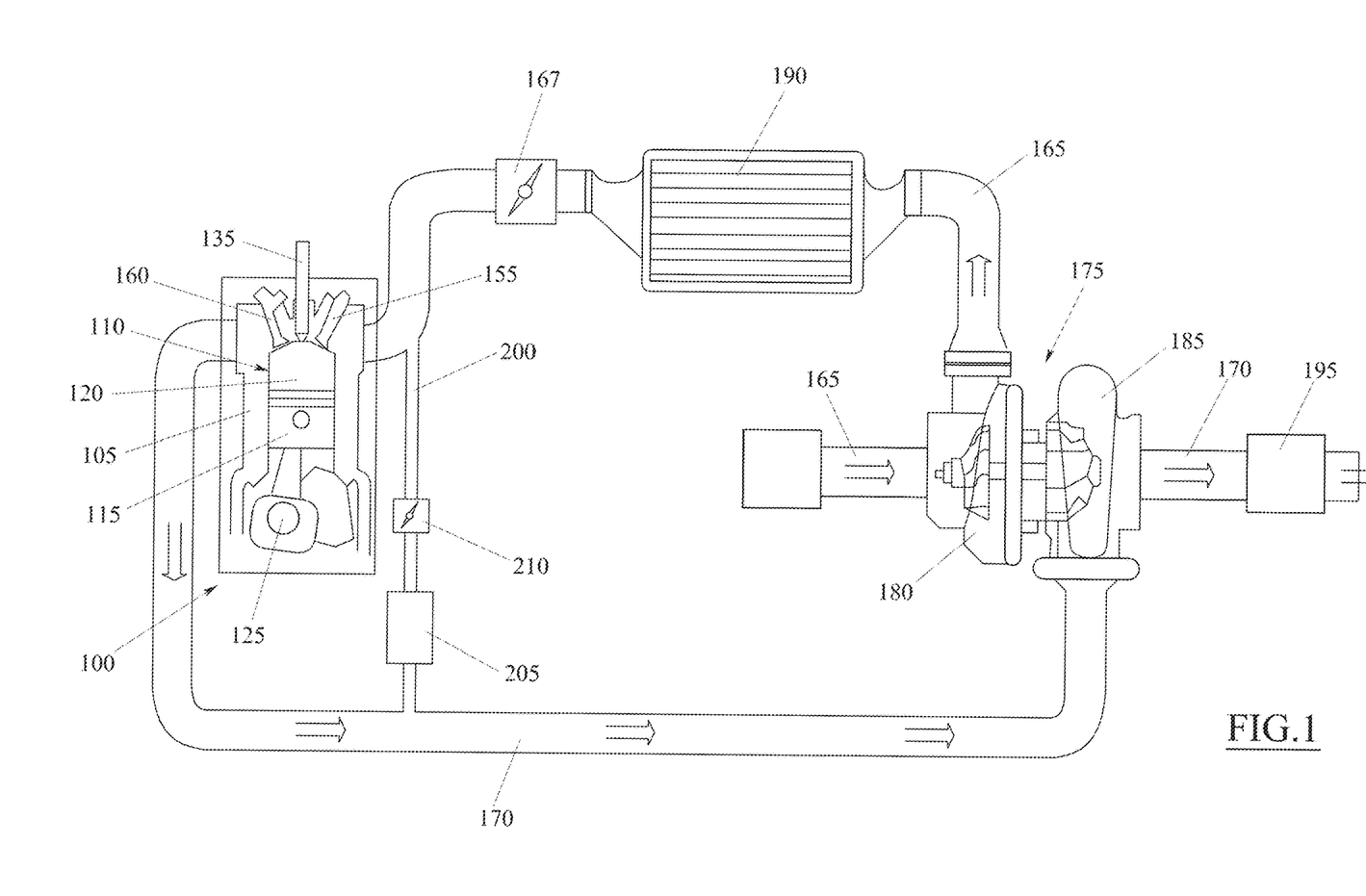
FIG. 1 is a schematic view an embodiment of an internal combustion engine which incorporates the features of the disclosure.

FIG. 1 shows an example embodiment that includes an internal combustion engine (ICE) 100. The internal combustion engine 100 may be, for example, a compression-ignited engine, such as a diesel engine, a spark-ignited engine such as a gasoline engine, or another type of engine. The internal combustion engine 100 may be used in a motor vehicle, such as a passenger car, a truck or an agricultural off-road vehicle. In other embodiments, the internal combustion engine 100 may be used in power generators or power equipment. The internal combustion engine 100 may be used in various other applications.

The internal combustion engine 100 may include an engine block 105 defining at least one cylinder 110. Each cylinder 110 may accommodate a reciprocating piston 115. Each piston 115 may cooperate with the cylinder 110 to define a combustion chamber 120 designed for receiving a fuel and air mixture. The fuel and air mixture may be ignited (typically via compression, but in some systems may be due to a heater or spark). The ignition of the fuel and air mixture may generate hot expanding exhaust gasses that cause the movement of the piston 115. On the opposite side of the combustion chamber 120, the piston 115 may be coupled to a crankshaft 125 in such a way that the reciprocating movements of the piston 115 are transformed in a rotational movement of the crankshaft 125.

The internal combustion engine 100 may comprise one cylinder 110. In other systems, the internal combustion engine 100 may comprise a plurality of cylinders 110 (e.g. 2, 3, 4, 6, or 8 cylinders), each of which may accommodate a corresponding piston 115 to define a corresponding combustion chamber 120. In multiple-cylinder engines, all the pistons 115 may be coupled to the same crankshaft 125. Each cylinder 110 may have at least two valves, including an intake valve 155 that allows air into the combustion chamber 120 and at least one exhaust valve 160 that allows exhaust gasses to exit from the combustion chamber 120. The valves 155 and 160 may be actuated by a camshaft which may rotate in time with the crankshaft 125, wherein a cam phaser may be provided for selectively varying the timing between the camshaft and the crankshaft 125.

Intake air may be conveyed to the intake valve 155 by means of an air intake duct 165 that provides air from the ambient environment to the combustion chamber 120 defined by the cylinder 110. The intake air may be passed through an air filter prior to introduction into the combustion chamber 120. If the internal combustion engine 100 comprises a plurality of cylinders 110, an intake manifold may be provided for receiving the air from the intake duct 165 and distributing it into all the cylinders 110 via the corresponding intake valves 155. In some embodiments, a throttle body 167 may be provided in the intake duct 165, for example upstream of the intake manifold if present, to regulate the flow of air into the one or more cylinders 110.

The exhaust gasses (resulting from the ignition of the fuel and air mixture in the combustion chamber 120) may exit the engine cylinder 110 through the one or more exhaust valves 160, and may be directed into an exhaust duct 170. The exhaust duct 170 may convey the exhaust gasses and expel them into the ambient environment. In some embodiments where the internal combustion engine 100 comprises a plurality of cylinders 110, all the corresponding exhaust valves 160 may be in fluid communication with an exhaust manifold, which may collect the exhaust gasses and direct them into the exhaust duct 170.

The internal combustion engine 100 may also comprise one or more after-treatment devices 195, which may be disposed in the exhaust duct 170 so that the exhaust gasses pass through them prior to expulsion into the ambient environment. The aftertreatment devices 195 may be or include any device configured to change the composition of the exhaust gasses, for example through retention and/or chemical transformation of some of their constituents. Some examples of aftertreatment devices 195 include, but are not limited to, catalytic converters (two and three way), oxidation catalysts, lean $NO_x$ traps, hydrocarbon adsorbers, selective catalytic reduction (SCR) systems, diesel oxidation catalysts (DOC), and particulate filters (e.g. Diesel particulate filters).

Some embodiments may also include an exhaust gas recirculation (EGR) system for recirculating at least part of the exhaust gasses from the exhaust system back to the intake system. The EGR system may include an EGR duct 200 coupled between the exhaust duct 170 and the intake duct 165, for example between the exhaust manifold and the intake manifold when present. The EGR system may further include an EGR cooler 205 to reduce the temperature of the exhaust gasses in the EGR duct 200 and/or an EGR valve 210 for regulating a flow of exhaust gasses in the EGR duct 200. Other engines may not include the EGR system and the corresponding components.

Figure 6:
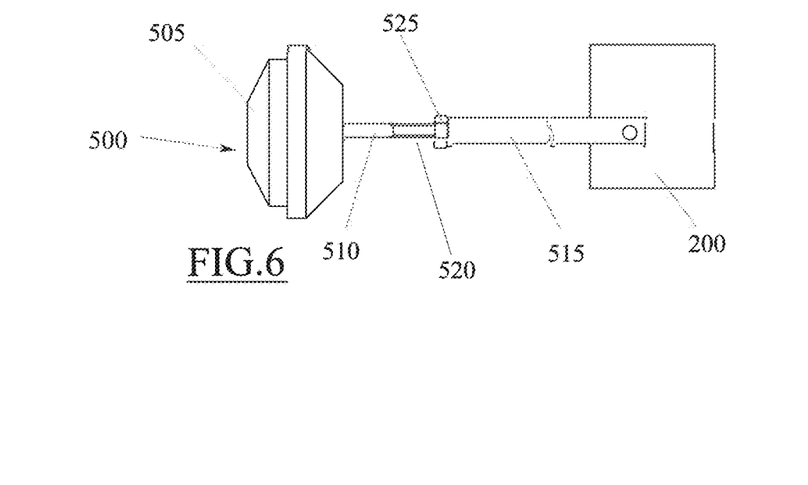
FIG. 6 is a schematic view of a wastegate valve of the internal combustion engine.
Figure 7:
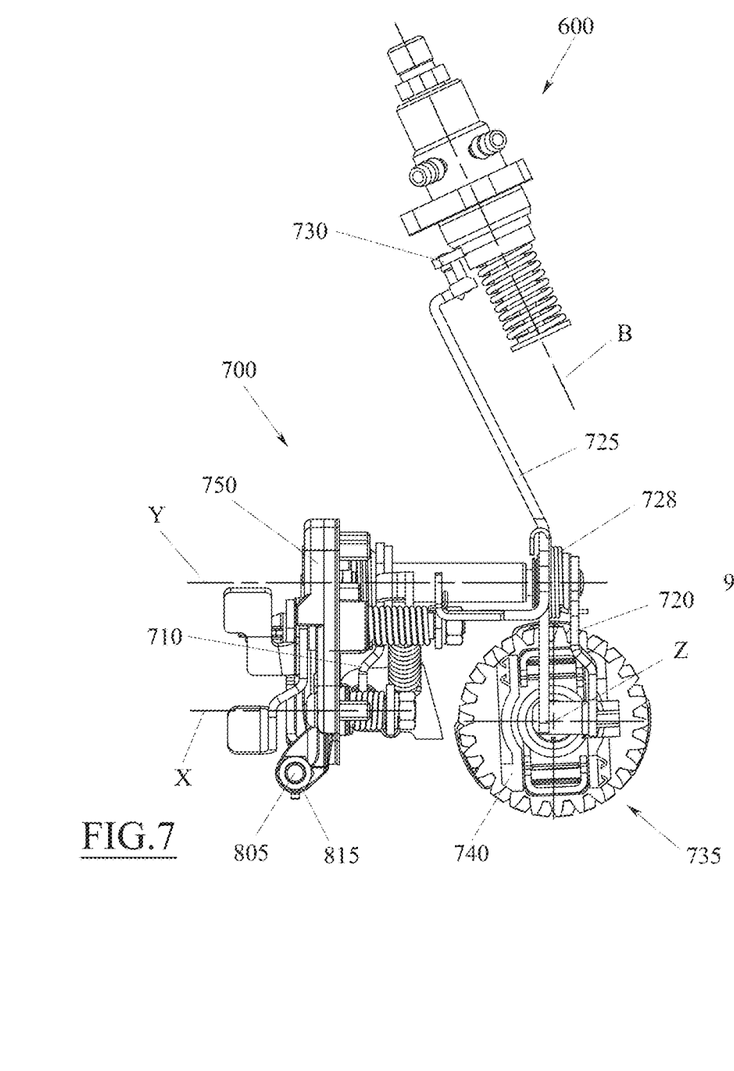
FIGS. 7-10 are views of a mechanical governor for the fuel pump.

In some embodiments, the internal combustion engine 100 may comprises a forced air system, such as a turbocharger 175. Other internal combustion engines may not include the turbocharger 175 and the corresponding components for turbocharging. The turbocharger 175 (if present) may comprise a compressor 180 located in the intake duct 165 and a turbine 185 located in the exhaust duct 170 and rotationally coupled to the compressor 180. The turbine 185 may rotate by receiving exhaust gasses from the exhaust duct 170 that directs the exhaust gasses through a series of vanes prior to expansion through the turbine 185. The rotation of the turbine 185 causes the rotation of the compressor 180, whose effect is that of increasing the pressure and the temperature of the air in the intake duct 165. An intercooler 190 may be disposed in the intake duct 165, downstream of the compressor 180, to reduce the temperature of the air. In some examples, the turbine 185 may be a variable geometry turbine (VGT) with a VGT actuator arranged to move the vanes to alter the flow of the exhaust gasses through the turbine 185. In other embodiments, the turbocharger 175 may be fixed geometry and/or include a wastegate valve 500, an example of which is schematically represented in FIG. 6.

The wastegate valve 500 may be normally closed and may be opened to allow part of the exhaust gasses to bypass the turbine 185. The wastegate valve 500 may be actuated by an actuating device 505, which is configured to open the wastegate valve 500 when the pressure inside the intake duct 165 downstream of the compressor 180, for example inside the intake manifold (if present), exceeds a predetermined threshold value. The actuating device 505 may comprise a rod 510 which moves axially in response to a pressure variation in the intake duct 165 and which is connected to the wastegate valve 500 through a bolt 515. In particular, the rod 510 may comprise a threaded portion 520 that is screwed into a corresponding threaded hole of the bolt 515. In this way, by screwing or unscrewing the threaded portion 520 with respect to the bolt 515, it is possible to change the effective length of the rod 510, thereby adjusting the pressure threshold value at which the wastegate valve 500 opens. After this regulation, which can be performed by authorized personnel at the end of the engine production line, the rod 510 may be blocked by means of a locking nut 525 that is screwed onto the threaded portion 520 and tightened against an axial end of the bolt 515. Once the locking nut 525 has been tightened, the locking nut 525 should never be unscrewed again, in order to prevent unintentional and/or unauthorized modifications of the rod position and thus of the behavior of wastegate valve 500.

Figure 2:
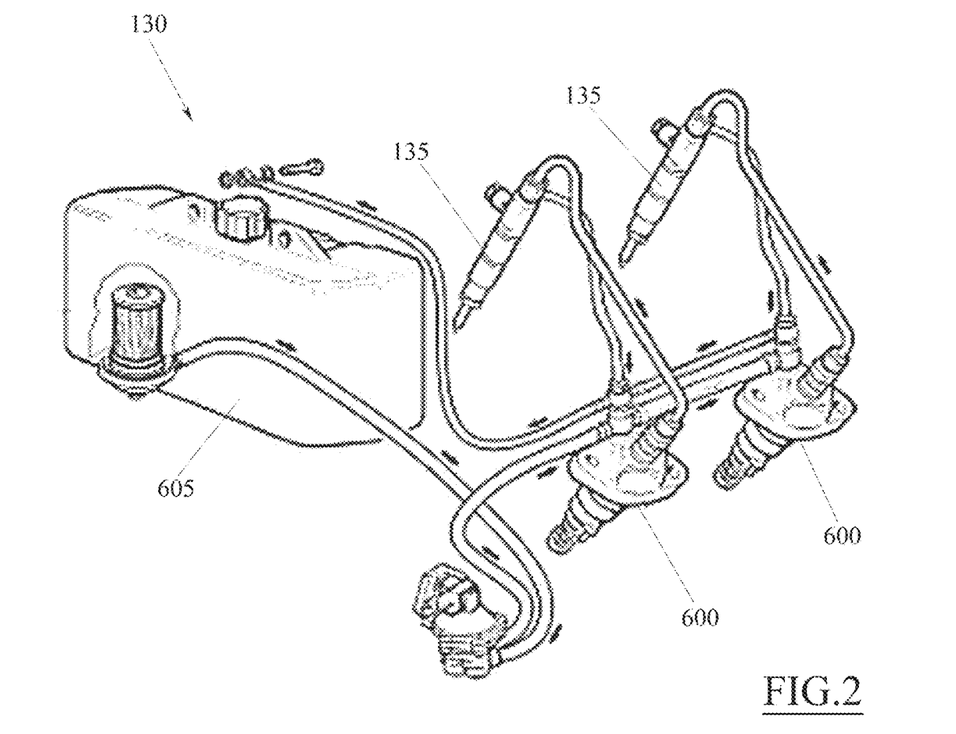
FIG. 2 shows an injection apparatus of the internal combustion engine.

The fuel may be supplied into each combustion chamber 120 by an injection apparatus 130, an example of which is shown in FIG. 2: the injection apparatus 130 may comprise at least one fuel injector 135, which may be coupled to the cylinder 110 or otherwise in fluid communication with the combustion chamber 120 (see FIG. 1) in order to inject fuel directly inside the combustion chamber 120. In multiple-cylinder engines, the injection apparatus 130 may comprise a plurality of fuel injectors 135, each of which is coupled to a corresponding cylinder 110.

Figure 5:
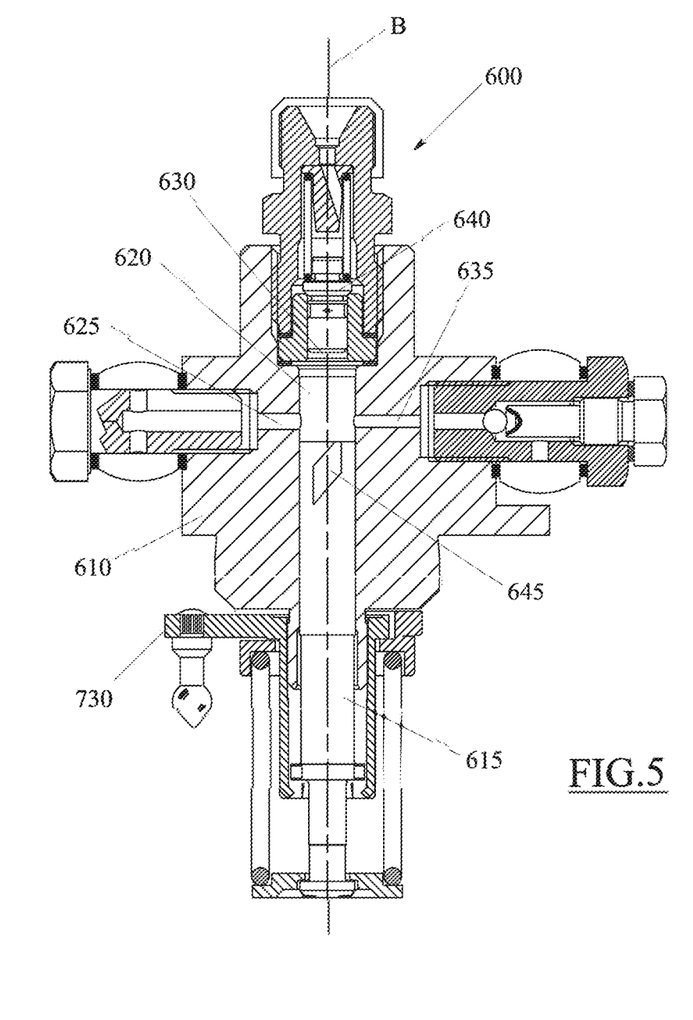
FIG. 5 is the section V-V of FIG. 4.

In some embodiments, each fuel injector 135 may receive fuel from a corresponding fuel pump 600 that draws the fuel from a fuel source 605, for example a tank, and delivers it to the fuel injector 135. Each fuel pump 600 may be a volumetric pump, for example a piston pump. As shown in the example of FIG. 5, each fuel pump 600 may comprise a cylinder 610 and a piston (or plunger) 615 accommodated inside the cylinder 610 to define a pump chamber 620. The piston 615 may be actuated to slide inside the cylinder 610 between a bottom dead center position, in which the pump chamber 620 has a maximum volume, and a top dead center position, in which the pump chamber 620 has a minimum volume. The piston 615 may be actuated for example by a camshaft which may rotate in time with the crankshaft 125. The cylinder 610 may be provided with an intake conduit 625 in communication with the fuel source 605, a delivery conduit 630 in communication with the fuel injector 135, and a return conduit 635 in communication with the fuel source 605. The delivery conduit 630 may be provided with a check valve 640 that only opens the delivery conduit 630 when the pressure inside the pump chamber 620 exceeds a predetermined threshold value. When the piston 615 is in the bottom dead center position, the intake conduit 625 and the return conduit 635 may be both in communication with the pump chamber 620 (as shown in FIG. 5), which is thus filled up with fuel coming from the fuel source 605. During the motion towards the top dead center position, the piston 615 closes first the intake conduit 625 and the return conduit 635 and then compresses the fuel within the pump chamber 620, until the check valve 640 opens and allows the fuel towards the fuel injector 135.

To regulate the fuel quantity supplied to the fuel injector 135, the lateral surface of the piston 615 may be provided with a groove 645 which is in communication with the pump chamber 620 and faces the return conduit 635, before the piston 615 reaches the top dead center position. In this way, the last part of the fuel that has been trapped inside the pump chamber 620 is not delivered to the fuel injector 135 but, flowing through the groove 645, is returned to the fuel source 605. The groove 645 may be oblique with respect to an axis B of the piston 615, for example it may have a helical shape, so that it faces the return conduit 635 for different axial positions of the piston 615, depending on the angular position of the piston 615 inside the cylinder 610. As a consequence, by changing the angular position of the piston 615 inside the cylinder 610 is effectively possible to regulate the quantity of fuel that is returned to the fuel source 605 and thus the fuel quantity that is delivered to the fuel injector 135.

Figure 3:
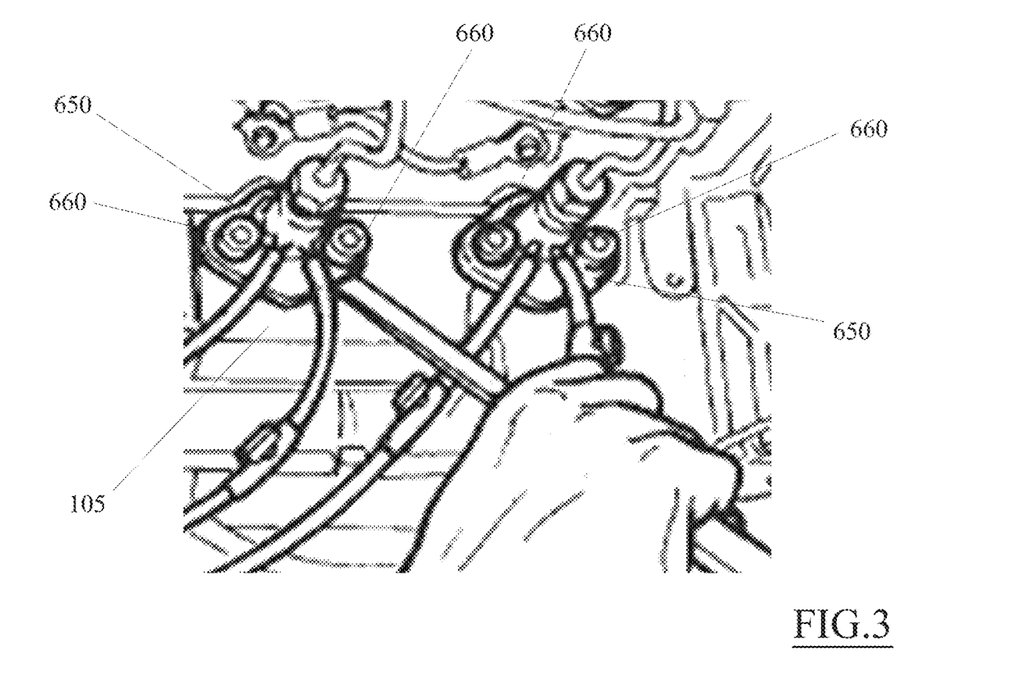
FIG. 3 shows a detail of the injection apparatus.
Figure 4:
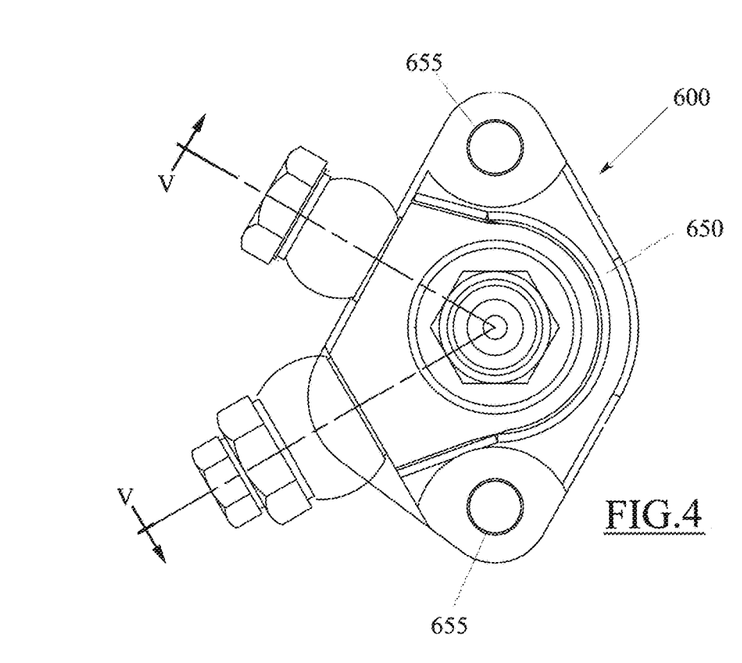
FIG. 4 is a top view of a fuel pump of the injection apparatus.

In multiple-cylinder engines, each fuel pump 600 under the same operating conditions should be able to deliver to the corresponding fuel injector 135 the same fuel quantity. Since the fuel pumps 600 may be slightly different from one another, for example due to production spread, a setting activity is usually performed at the end of the engine production line. This setting activity may generally provide for manually rotating by few degrees the cylinders 610 of the fuel pumps 600 around the corresponding axes B, while keeping the pistons 615 steady. In this way, the angular position of the groove 645 with respect to the return conduit 635 may be changed, until all the fuel pumps 600 deliver the same fuel quantity. To allow this regulation, each cylinder 610 may comprise a flange 650 having one or more through-holes 655. As shown in FIG. 3, the flange 650 may be secured to the engine block 105, for example by means of one or more fastening screws 660, each of which passes in a corresponding through-hole 655 of the flange 650 and is screwed in a corresponding threaded hole of the engine block 105. In particular, the through-holes 655 of the flange 650 may be at least slightly larger than the fastening screw 660. In this way, the angular position of the cylinder 610 may be regulated by unscrewing at least partially the fastening screw 660, rotating the cylinder 610 around the axis B, and then screwing and tightening the fastening screw 660 again, in order to block the cylinder 610 with respect to the engine block 105. Once the right angular position has been reached, the cylinder 610 of each fuel pump 600 should never be moved again in order to prevent unintentional and/or unauthorized adjustments of the fuel quantity.

Irrespective of the preliminary setting detailed above, the fuel quantity delivered by each fuel pump 600 may be also regulated during the operation of the internal combustion engine 100, in response to variations of the operating conditions. To allow this regulation, the piston 615 may be coupled to a mechanical governor 700, as shown in FIGS. 7-10, which is able to rotate the piston 615 within the correspondent cylinder 610. In multiple-cylinder engines, the pistons 615 of all the fuel pumps 600 may be coupled to the same governor 700.

The governor 700 may comprise an accelerator lever 705 having a predetermined rotation axis X. The accelerator lever 705 may be coupled to an accelerator pedal or to another accelerator element so that, when the accelerator pedal is depressed, the accelerator lever 705 is rotated in the direction indicated with H in FIG. 10. The governor 700 may also comprise a tensioning rocker 710 having a rotation axis Y which is parallel to the axis X. The tensioning rocker 710 may be connected to the accelerator lever 705 by means of a governor spring 715. In this way, when the accelerator lever 705 is rotated in the direction H, the governor spring 715 is tensioned and tends to rotate the tensioning rocker 710 in the opposite direction G. The tensioning rocker 710 may be rigidly coupled to a lever 720, so that the lever 720 is bound to rotate around the axis Y together with the tensioning rocker 710. The lever 720 may be coupled, for example by means of a spring 728, to a control rack 725 having the same rotation axis Y, so that the control rack 725 is rotationally bound to the lever 720 for rotation in direction G but is rotationally free in the opposite direction H. The control rack 725 may be coupled to a metering sleeve 730 of the fuel pump 600 (see FIG. 5). The metering sleeve 730 is rotationally bound to the piston 615 and can thus rotate, together with the piston 615, around the axis B of the latter. In this way, when the control rack 725 rotates in direction G, the metering sleeves 730 rotates the piston 615 in a direction that increases the fuel quantity delivered by the fuel pump 600.

The governor 700 may further comprise a speed regulator 735. The speed regulator 735 may comprises a rotating hub 740 having a rotation axis Z which is orthogonal to the axis Y. The rotating hub 740 may be actuated by a camshaft which may rotate in time with the crankshaft 125. The rotating hub 740 may carry flyweights that move away from the rotation axis Z in response to an increase of the rotation speed of the internal combustion engine 100 (i.e. of the crankshaft 125). This movement of the flyweights is transformed in an axial movement of a sliding bolt 745 along the axis Z that urges the lever 720 and the control rack 725 to rotate in the direction H, so as to reduce the fuel quantity delivered by the fuel pump 600.

The governor 700 may further comprise two stop screws, including a first stop screw 800 for determining and regulating a minimum rotational speed (idle speed) of the internal combustion engine 100, and a second stop screw 805 for determining and regulating a maximum rotational speed (full load speed) of the internal combustion engine 100. Each one of these stop screws 800 and 805 may be screwed into a correspondent threaded through-hole of a protruding rib of a casing 750 that covers at least partially the governor 700. In particular, the first stop screw 800 may be disposed so that one of its ends hits the accelerator lever 705, when the latter moves in direction G to reduce the engine load. On the other hand, the second stop screw 805 may be disposed so that one of its ends hits the accelerator lever 705, when the latter moves in direction H to increase the engine load. In this way, the first and the second stop screws 800 and 805 define and limit the rotation of the accelerator lever 705, thereby defining the minimum and the maximum quantity of fuel that can be supplied to the injector(s) 135 of the internal combustion engine 100. These minimum and/or maximum quantities may be adjusted by screwing or unscrewing the stop screws 800 and 805 in the correspondent though-holes of the casing 750, thereby varying their axial position. This regulation may be performed by authorized personnel at the end of the engine production line and, after that, the stop screws 800 and 805 may be blocked by a locking nut 815. Once the locking nuts 815 have been tightened, they should never be manipulated again, in order to prevent unintentional and/or unauthorized adjustments of the stop screws 800 and 805.

Figure 8:
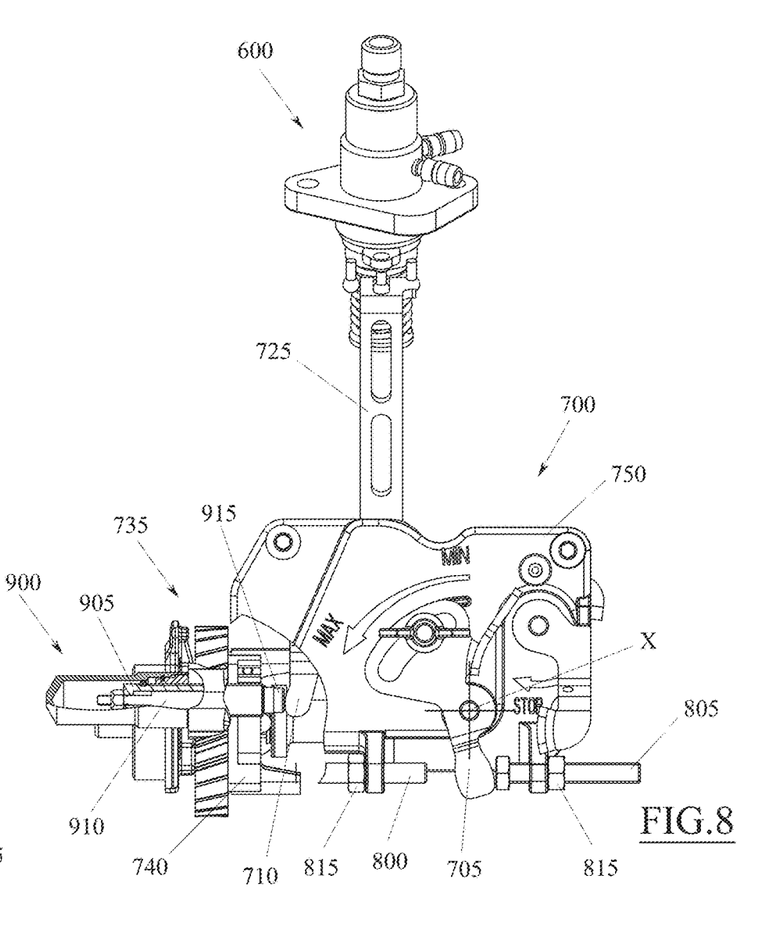
Figure 9:
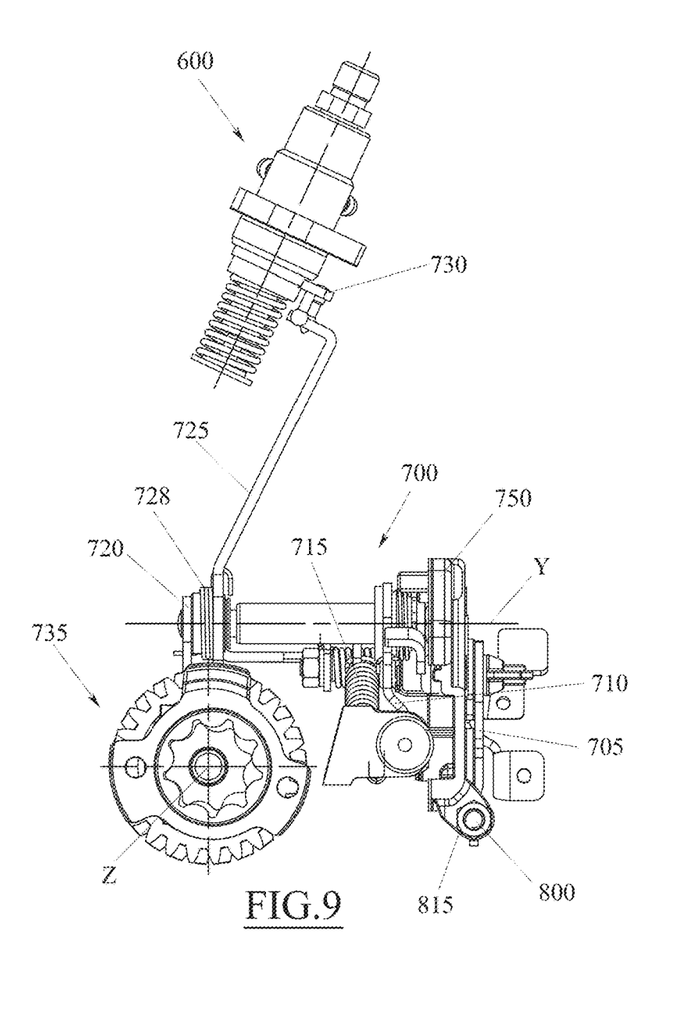
Figure 10:
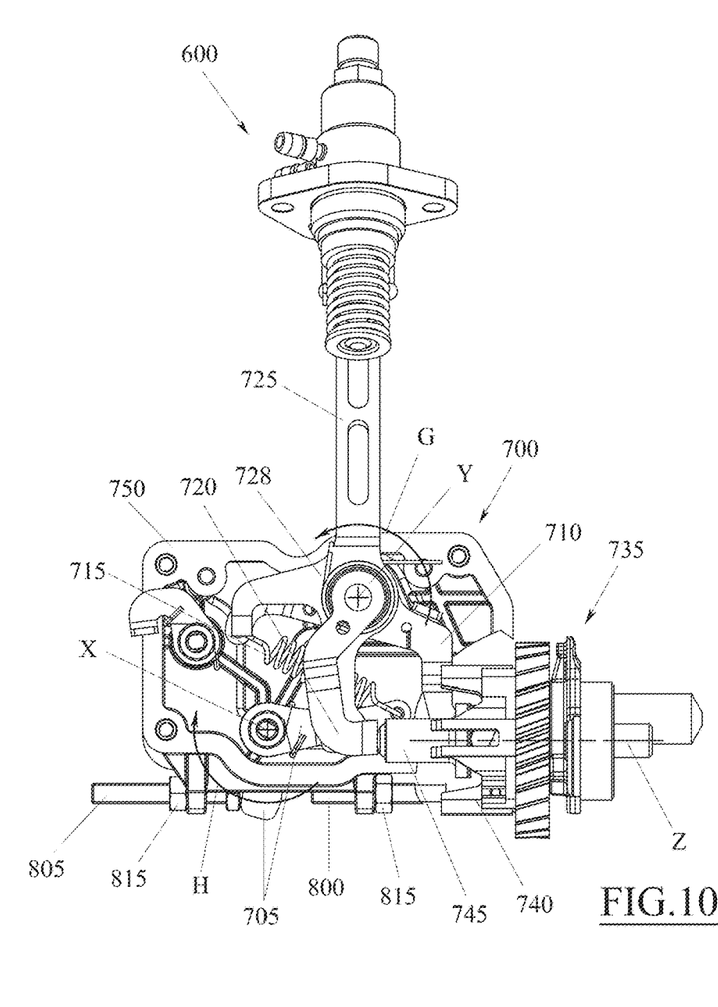
Figure 11:
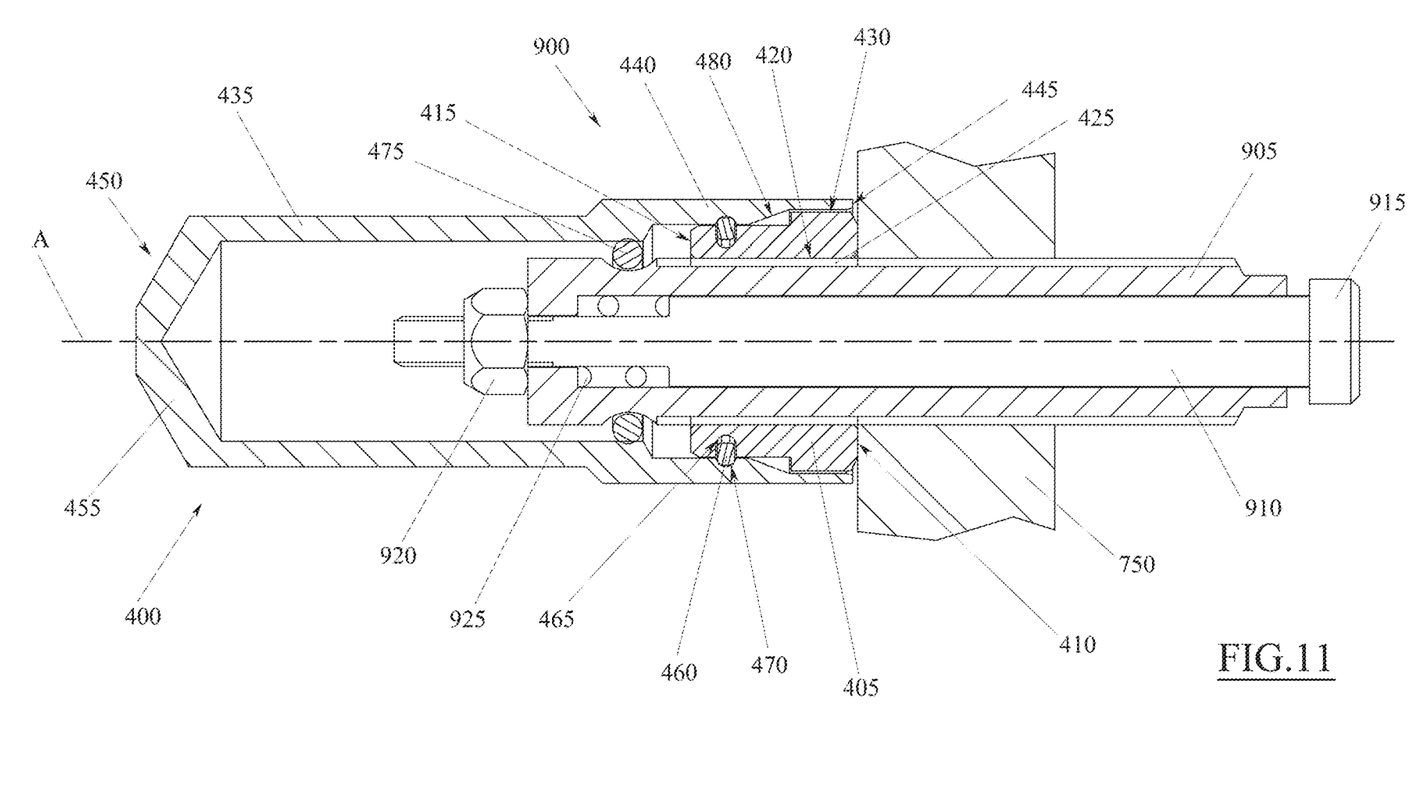
FIG. 11 is a cross-section of an anti-tampering device according to a first embodiment of the disclosure.

The governor 700 may also comprise a torque control device 900, as shown for example in FIGS. 8 and 11. The torque control device 900 may comprise a cylindrical housing 905 having a threaded external surface. The cylindrical housing 905 may be screwed into a threaded through-hole of the casing 750, so that a first end of the cylindrical housing 905 is exposed on the external side of the casing and the second end protrudes inside. The cylindrical housing 905 accommodates a pin 910 having a head 915 that protrudes from the second end of the cylindrical housing 905 towards the interior of the casing 750. The pin 910 can slide inside the cylindrical housing 905 from an extracted position (shown in FIG. 11), in which the head 915 is located at a maximum distance from the second end of the cylindrical housing 905, and a retracted position, wherein the head 915 is located at a minimum distance from the second end of the cylindrical housing 905 (e.g. in contact). The stroke of the pin 910 between these two positions may be quite small and may be limited, on one side, by the head 915 and, on the opposite side, by a nut 920 that is screwed onto a threaded portion of the pin 910 that protrudes from the first end of the cylindrical housing 905. A spring 925 may be accommodated inside the cylindrical housing 905 to push the pin 910 towards the extracted position. The torque control device 900 may be disposed so that the sliding axis of the pin 910 is orthogonal to the rotation axis Y of the tensioning rocker 710 and so that the head 915 hits the tensioning rocker 710, when the latter moves in direction G to increase the engine load. In this way, the axial movement of the pin 910, in response to the rotation of the tensioning rocker 710, allows at least a partial control of the torque generated by the internal combustion engine 100.

This effect may be adjusted by screwing or unscrewing the cylindrical housing 905 of the torque control device 900 with respect to the casing 750 and/or by screwing or unscrewing the nut 920, thereby varying the axial position of the head 915. These regulations may be performed by authorized personnel at the end of the engine production line. After these regulations have been performed, the cylindrical housing 905 and the nut 920 should not be manipulated again, in order to prevent unintentional and/or unauthorized modifications of the behavior of the torque control device 900.

In order to prevent this unintentional and/or unauthorized manipulation, an anti-tampering device 400 may be used. The anti-tampering device 400 may comprise a threaded element 405 that may be embodied as a nut. In particular, the threaded element 405 may have a first base 410 and a second base 415, which may be for example planar and parallel to one another, and a through-hole 420 extending between these first and second bases. A female (internal) thread 425 may be realized on the internal surface of the through-hole 420. The thread 425 defines a screwing axis A of the threaded element 405 and may be dimensioned to engage the male (external) thread of the cylindrical housing 905, thereby allowing the threaded element 405 to be coaxially screwed onto the cylindrical housing 905 and be tightened against the casing 750, to block the cylindrical housing 905 in the desired position.

To facilitate the screwing of the threaded element 405, the latter may comprise an engaging surface 430 for engagement with a driving tool, for example a wrench. In this example, the engaging surface 430 may be an external surface of the threaded element 405, for example an external surface that surrounds at least partially the through-hole 420. The engaging surface 430 may be a prismatic surface whose generators are parallel to the screwing axis A defined by the thread 425. The cross-section of the engaging surface 430, performed with a plane orthogonal to the screwing axis A, may have any shape, for example triangular, rectangular, square, pentagonal, hexagonal, heptagonal, octagonal, polygonal, star-shaped or any other shape having at least a linear segment and which is suitable to realize a prismatic joint between the threaded element 405 and a driving tool.

The engaging surface 430 may be located in proximity of the first base 410 of the threaded element 405 which is destined to come into contact with the casing 750. On the other side, the cylindrical housing 905 may protrude from the second base 415, in order to make the nut 920 accessible from the outside.

The anti-tampering device 400 may further comprise a protection body 435 designed to be coupled to the threaded element 405 for preventing the engaging surface 430 from being engaged by the driving tool. In this example, the protection body 435 may comprise an annular wall 440, for example having a cylindrical shape, which coaxially surrounds the threaded element 405, thereby covering the engaging surface 430. The annular wall 440 may have a first axial end 445, which is open for insertion of the threaded element 405, and an opposite second axial end 450. The first axial end 445 may be substantially coplanar with the first base 410 of the threaded element 405. The second axial end 450 may protrude over the second base 415 and may be closed by a back wall 455, so that the protection body 435 assumes the shape of a cap that covers and encloses the threaded element 405 and also the protruding portion of the cylindrical housing 905, including for example the nut 920. The back wall 455 may have any possible shape, for example a planar shape or dome shape.

The protection body 435 may be coupled to the threaded element 405 so that the protection body 435 is axially blocked to the threaded element 405 but free to spin around the screwing axis A. This coupling may be achieved by means of a retaining ring 460 which is partly accommodated in an annular groove 465 of the threaded element 405 and partly accommodated in an annular groove 470 of the protection body 435. The retaining ring 460 and the annular grooves 465 and 470 are all coaxial to the screwing axis A. In particular, the annular groove 465 may be realized on the external surface of the threaded element 405, for example in a cylindrical portion thereof that is located in proximity of the second base 415. The annular groove 470 may be realized on the internal surface of the annular wall 440 of the protection body 435. The axial distance between the annular groove 470 and the first axial end 445 of the protection body 435 may be equal or almost equal to the distance between the annular groove 465 and the first base 410 of the threaded element 405. In order to reduce the noise that can be originated by vibrations of the protection body 435 on the threaded element 405, an elastomeric ring 475, for example an annular gasket, may be coaxially interposed and radially compressed between the external surface of the cylindrical housing 905 and the annular wall 440 of the protection body 435.

For the anti-tempering device 400 to be assembled, the retaining ring 460 may be coupled to the annular groove 465 of the threaded element 405, before the coupling of the protection body 435. Between the first axial end 445 and the annular groove 465, the internal surface of the annular wall 440 may comprise an annular portion 480 that is tapered towards the annular groove 465. In this way, during the axial insertion of protection body 435 onto the threaded element 405, the tapered portion 480 radially compresses the retaining ring 460, which may deform elastically. When the annular groove 470 faces the annular groove 465, the retaining ring 460 elastically snaps into the annular groove 470, thereby realizing a form fitting that blocks the protection body 435 to the threaded element 405 in axial direction but allow it to freely spin around the screwing axis A. Once the protection body 435 has been coupled this way, the nut 20 and the threaded element 405, particularly its engaging surface 430, become inaccessible form the outside and cannot be screwed or unscrewed either manually or with the driving tools. In addition, since the protection body 435 spins around the screwing axis A, the protection body 435 cannot transmit torque to the threaded element 405, thereby ensuring that the threaded element 405 cannot be screwed or unscrewed in any way. On the other hand, the axial engagement between the protection body 435 and the two annular grooves 465 and 470 ensures that the protection body 435 cannot be removed, so that the threaded element 405 and the nut 920 can never be screwed or unscrewed again.

In order to improve the strength and the security of the axial binding between the protection body 435 and the threaded element 405, the retaining ring 460 may have a rectangular cross section. In other words, the cross section of the retaining ring 460, made with a plane containing the screwing axis A, may have a rectangular shape. In this way, the planar surfaces of the retaining ring 460, acting of the planar surfaces of the annular grooves 465 and 470, make an axial removal of the protection body 435 extremely difficult if not impossible.

An anti-tampering device of this kind is not only dedicated to the torque control device 900 but can be also applied to any threaded element that, once screwed in a desired position, for example at the end of the engine production line, should not be manipulated unintentionally and/or by unauthorized users, in order to not modify the performance of the internal combustion engine 100 or for any other reasons.

Figure 12:
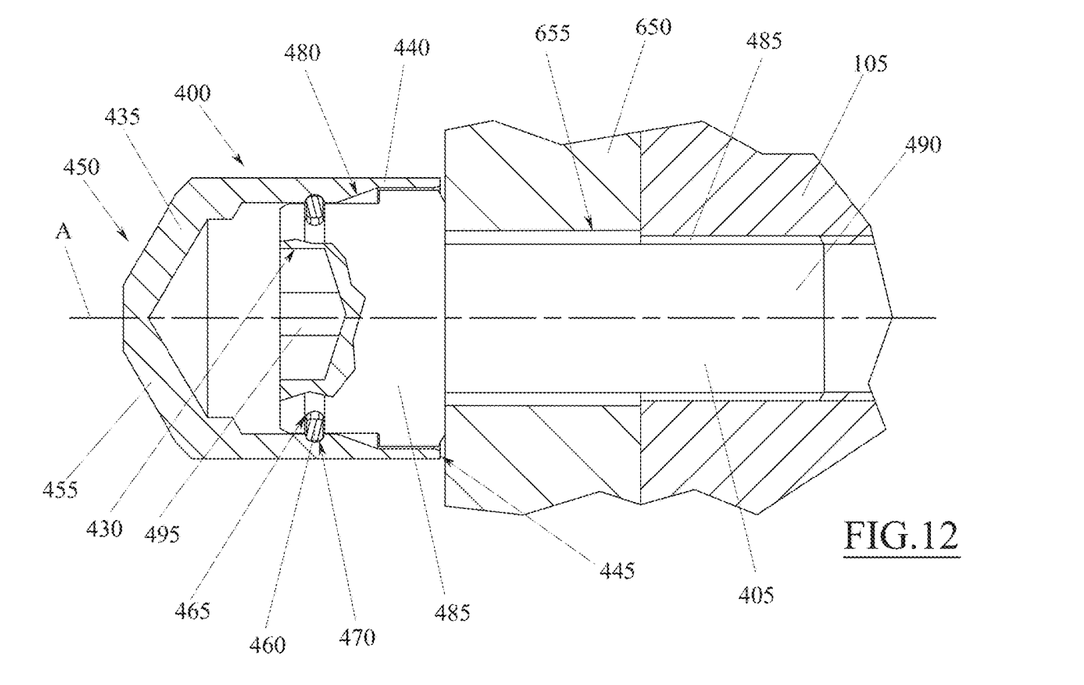
FIG. 12 is a cross-section of an anti-tampering device according to a second embodiment of the disclosure.

By way of example, a similar anti-tempering device 400 is shown in FIG. 12, where the components of the anti-tampering device 400 in common with the first example above are indicated with the same reference numbers. In this case, the anti-tampering device 400 may comprise a threaded element 405 which is embodied as a screw and which may be used for example to replace the fastening screw 660 of the fuel pumps 600. This threaded element 405 may particularly comprise a head 485, a shank 490 coaxially protruding from the head 485 and a male (external) thread 425 realized on the external surface of the shank 490. The thread 425 defines the screwing axis A of the threaded element 405 and may be dimensioned to pass through a corresponding hole 655 of the flange 650 and to engage a corresponding threaded hole the engine block 105. To facilitate the screwing and the unscrewing of the threaded element 405, the head 485 may comprise an engaging surface 430 for engagement with a driving tool, for example a wrench or a screwdriver. In this example, the head 485 may comprise a cavity or socket 495, which is realized on the opposite side with respect to the shank 490 (e.g. centered on the screwing axis A), and the engaging surface 430 may be an internal surface delimiting said cavity 495. However, in other embodiments, the engaging surface 430 could be an external surface of the head 485. Either way, the engaging surface 430 may be a prismatic surface whose generators are parallel to the screwing axis A. The cross-section of the engaging surface 430, with a plane orthogonal to the screwing axis A, may have any shape, for example triangular, rectangular, square, pentagonal, hexagonal, heptagonal, octagonal, polygonal, star-shaped or any other shape having at least a linear segment which is suitable to realize a prismatic joint between the head 675 and a driving tool.

For preventing the threaded element 405 from being manipulated, the protection body 435 may comprise an annular wall 440, for example having a cylindrical shape, which coaxially surrounds the head 485. The annular wall 440 may have a first axial end 445, which is open for insertion of the head 485, and an opposite second axial end 450, which is closed by a back wall 455, so as to cover completely or at least partially the mouth of the cavity 495. The protection body 435 may be coupled to the threaded element 405 as explained above, for example by means of a retaining ring 460, having for example a rectangular cross-section, which is partly accommodated in an annular groove 465 of the threaded element 405 and partly accommodated in an annular groove 470 of the protection body 435, wherein the annular groove 465 may be realized on the external surface of the threaded element 405, for example in a cylindrical portion thereof, and the annular groove 470 may be realized on the internal surface of the annular wall 440. Also in this example, between the first axial end 445 and the annular groove 465, the internal surface of the annular wall 440 may comprise an annular portion 480 that is tapered towards the annular groove 465.

Figure 13:
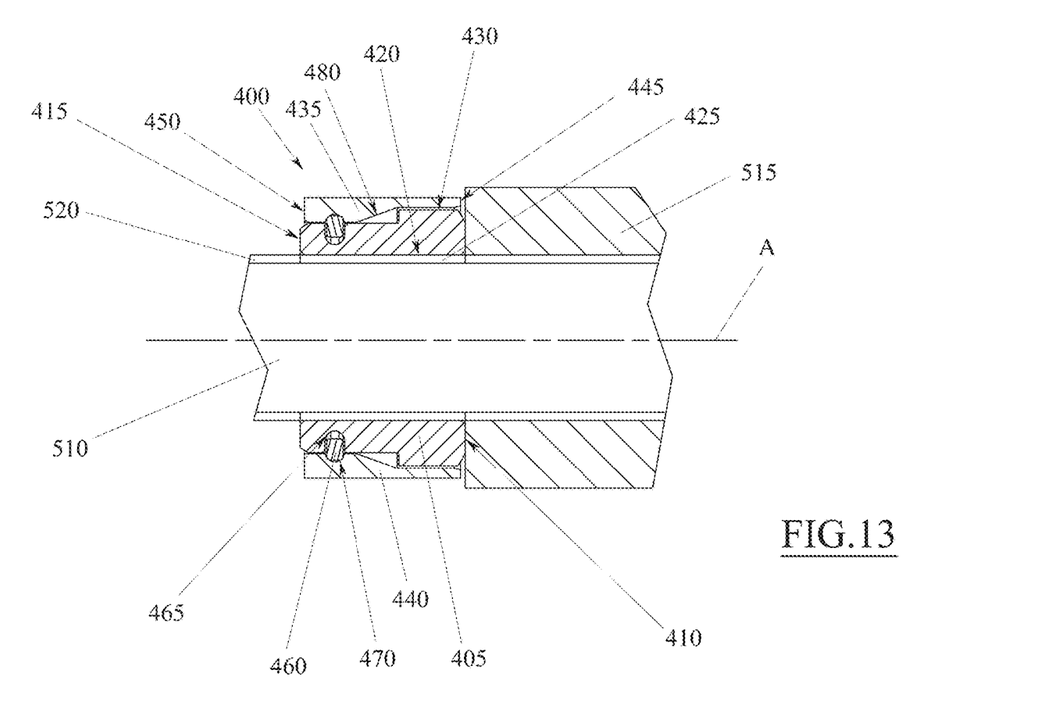
FIG. 13 is a cross-section of an anti-tampering device according to a third embodiment of the disclosure.

Another similar anti-tampering device 400 is shown in FIG. 13, wherein the components of the anti-tampering device in common with the first example above are indicated with the same reference numbers. In this case, the anti-tampering device 400 may comprise a threaded element 405 which is again embodied as a nut. The threaded element 405 may be used, for example, to replace the locking nut 525 of the wastegate valve 500, as indicated in FIG. 13, but it could also be used to replace the locking nut 815 of the first and second stop screws 800 and 805. The threaded element 405 of this third example has essentially the same features described in connection with the first example above. Once the threaded element 405 have been tightened, the protection body 435 can be coupled to the threaded element 405 to prevents his unintentional and/or unauthorized manipulation. The protection body 435, and its coupling to the threaded element 405, may have the same features described for the first example above, with the only difference that the second axial end 450 of the annular wall 440 may be open.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. An anti-tampering device comprising:
   a threaded element having a thread defining a screwing axis and an engaging surface for engagement with a driving tool;
   a protection body for preventing the driving tool from engaging the engaging surface;
   a cylindrical housing having a threaded portion along the screwing axis;
   a pin accommodated within the cylindrical housing and configured to slide between an extracted position and a retracted position; and
   a spring within the cylindrical housing configured to push the pin towards the extracted position;
   wherein the protection body is coupled to the threaded element so that the protection body and threaded element are mutually blocked in a direction parallel to the screwing axis and free to spin around the screwing axis.

2. The anti-tampering device according to claim 1, wherein the engaging surface of the threaded element is a prismatic surface whose generators are parallel to the screwing axis.

3. The anti-tampering device according to claim 1, wherein the engaging surface is an external surface of the threaded element and the protection body comprises an annular wall surrounding the engaging surface.

4. The anti-tampering device according to claim 1, wherein the engaging surface is an internal surface delimiting cavity of the threaded element and the protection body comprises a back wall that covers at least partially a mouth of the cavity.

5. The anti-tampering device according to claim 1, wherein the protection body is coupled to the threaded element by a retaining ring partly accommodated in an annular groove of the threaded element and partly accommodated in an annular groove of the protection body.

6. The anti-tampering device according to claim 5, wherein the protection body's annular groove is realized on an internal surface of an annular wall of the protection body which surrounds at least partially the threaded element and which has at least an open end for coupling with the threaded element.

7. The anti-tampering device according to claim 6, wherein an opposite end of the annular wall is closed by a back wall of the protection body.

8. The anti-tampering device according to claim 6, wherein an opposite end of the annular wall is open.

9. The anti-tampering device according to claim 6, wherein the internal surface of the annular wall comprises, between the open end and the annular groove, an annular portion tapered towards the annular groove.

10. The anti-tampering device according to claim 6, further comprising:
an elastomeric ring coaxially interposed between the cylindrical housing and an annular wall of the protection body.

11. The anti-tampering device according to claim 5, wherein the retaining ring has a rectangular cross-section.

12. The anti-tampering device according to claim 1, wherein the thread of the threaded element is a female thread.

13. The anti-tampering device according to claim 12, wherein the threaded element of the cylindrical housing is a male thread that is screwed into the female thread of the threaded element.

14. The anti-tampering device according to claim 13, further comprising:
an elastomeric ring coaxially interposed between the cylindrical housing and the annular wall of the protection body.

15. A method for assembly of an anti-tampering device, the method comprising:
providing a threaded element having a thread defining a screwing axis and an engaging surface for engagement with a driving tool;
providing a protection body for preventing the driving tool from engaging the engaging surface;
providing a cylindrical housing having a threaded portion along a screwing axis;
providing a pin accommodated within the cylindrical housing and configured to slide between an extracted position and a retracted position;
providing a spring within the cylindrical housing configured to push the pin towards the extracted position; and
coupling the protection body to the threaded element so that the protection body and the threaded element are mutually blocked in a direction parallel to the screwing axis and free to spin around the screwing axis.

16. The method of claim 15, wherein the engaging surface of the threaded element is a prismatic surface whose generators are parallel to the screwing axis.

17. The method of claim 15, wherein the engaging surface is an external surface of the threaded element and the protection body comprises an annular wall surrounding the engaging surface.

18. The method of claim 15, wherein the engaging surface is an internal surface delimiting a cavity of the threaded element and the protection body comprises a back wall that covers at least partially a mouth of the cavity.

19. The method of claim 15, wherein the protection body is coupled to the threaded element by a retaining ring partly accommodated in an annular groove of the threaded element and partly accommodated in an annular groove of the protection body.

20. An internal combustion engine comprising:
at least one cylinder; and
an anti-tampering device, the anti-tampering device comprising:
a threaded element having a thread defining a screwing axis and an engaging surface for engagement with a driving tool; and
a protection body for preventing the driving tool from engaging the engaging surface;
a cylindrical housing having a threaded portion along the screwing axis;
a pin accommodated within the cylindrical housing and configured to slide between an extracted position and a retracted position; and
a spring within the cylindrical housing configured to push the pin towards the extracted position;
wherein the protection body is coupled to the threaded element so that the protection body and threaded element are mutually blocked in a direction parallel to the screwing axis and free to spin around the screwing axis.

* * * * *